United States Patent [19]

Draper et al.

[11] 4,295,219
[45] Oct. 13, 1981

[54] MEMORY WRITE ERROR DETECTION CIRCUIT

[75] Inventors: Don R. Draper, Lisle; Peter Kusulas, Jr., Glen Ellyn, both of Ill.

[73] Assignee: Bell Telephone Laboratories, Incorporated, Murray Hill, N.J.

[21] Appl. No.: 135,248

[22] Filed: Mar. 31, 1980

[51] Int. Cl.³ .............................................. G06F 11/10
[52] U.S. Cl. ..................................... 371/51; 364/900
[58] Field of Search ................... 371/49, 51; 364/200, 364/900

[56] References Cited

U.S. PATENT DOCUMENTS

| | | | |
|---|---|---|---|
| 3,992,696 | 11/1976 | Fergeson | 371/51 |
| 4,045,781 | 8/1977 | Levy et al. | 364/200 |
| 4,050,059 | 9/1977 | Williams et al. | 364/200 |

*Primary Examiner*—Charles E. Atkinson
*Attorney, Agent, or Firm*—Peter Visserman

[57] ABSTRACT

A circuit for the detection of write errors in a memory with selectable byte addressing. The memory is capable of selectively writing bytes within a memory word by decoding control signals and address signals received from a processor. The decoder and transmission path of the control signals are checked by the processor generating incorrect parity for the bytes which are not to be written. The memory decodes the control signals, checks the parity of the bytes, and generates a write parity error if the decoder selects a byte with incorrect parity to be written. If the memory malfunctions and spuriously writes an unselected byte, this fact will be detected when the unselected byte is read. The memory checks each byte read for parity, and incorrect parity causes the memory to transmit a read memory error to the processor.

4 Claims, 4 Drawing Figures

MEMORY WRITE ERROR DETECTION CIRCUIT

TECHNICAL FIELD

This invention relates to a data processing system, and more specifically, to a memory arrangement having an error detection circuit for use in such a data processing system.

BACKGROUND OF THE INVENTION

Data processing systems which selectively write bytes in a multibyte memory word location in a memory system are known in the art. An example of such a system is described in U.S. Pat. No. 4,045,781. This patent teaches the use of control signals and the least significant two bits of the address for the selective writing of bytes within a memory word location addressed by the remaining bits of the address. The patent further teaches that these signals may be decoded and transmitted by a write decoder to the memory system with parity bits to allow the detection of errors caused by a malfunction of the memory system. The consequences of a wrong byte being written and going undetected is of serious consequence to data processing systems. In a data processing system which requires high reliability, it is necessary to be able to detect any occurrence of the wrong byte being written. However, the prior art does not teach a method for detecting errors in either the transmission path or the write decoder. Further, the prior art does not teach a method for detecting a memory system malfunction which causes the writing of an unselected byte.

SUMMARY OF THE INVENTION

In accordance with our invention, the writing of unselected bytes is detected by the generation of check bits such that the bits of each byte to be written have a predetermined arithmetic or logical relationship and the bits of each byte not to be written have some relationship other than the predetermined relationship. If any byte is written whose bits do not have the predetermined relationship, an error has occurred and a write memory error signal is generated. A processor generates a multibyte data word wherein each byte comprises data and check bits, byte write signals which define the bytes to be written, and address signals which define memory data word locations. A check bit generator in the processor generates the check bits for each byte such that the bits of each byte selected to be written have a predetermined arithmetic or logical relationship and the bits of each byte not selected to be written have some relationship other than the predetermined relationship. A control decoder responds to the byte write signals to generate a write control signal for each byte to be written. A memory arrangement responds to the address signals and one of the write control signals to store a byte in the selected word location. A checker circuit associated with the memory arrangement checks each of the bytes of a multibyte data word. It generates a first output signal for each byte having the predetermined relationship and a second output signal for each byte having some relationship other than the predetermined relationship. For each byte, a comparator compares the output signals of the control decoder and the checker circuit and generates a write memory error signal for any byte which has associated with it a write control signal and a second output signal.

Advantageously, the checker circuit may be a parity check circuit, and the check bit generator may be a parity generator. Furthermore, the predetermined arithmetic or logical relationship may be even or odd parity.

Another aspect of this invention is that a memory malfunction resulting from the writing of an unselected byte is detected by a read error circuit associated with the checker circuit generating a read memory error signal when the processor reads the incorrectly written byte. The checker circuit also checks the bytes of words read from the memory and generates a first output signal for each byte whose bits have the predetermined relationship. Since only bytes having the predetermined relationship should have been written in memory, any byte for which a first output signal is not generated must have been incorrectly written. The read error circuit generates the read memory error signal when a byte is read and the first output signal is not generated.

Advantageously, the check bit generator may comprise a decoder circuit and a plurality of generator circuits, wherein each generator circuit is associated with one byte of the data word. The decoder circuit decodes the byte write signals and transmits an output signal to the generator circuit associated with each byte to be written. Each generator circuit produces the predetermined relationship of data and check bits by generating the correct check bits if the output signal is present and produces some relationship other than the predetermined relationship if the output signal is not present.

BRIEF DESCRIPTION OF THE DRAWING

The invention will be better understood from the following detailed description when read with reference to the drawing in which.

DETAILED DESCRIPTION

Figure 1:
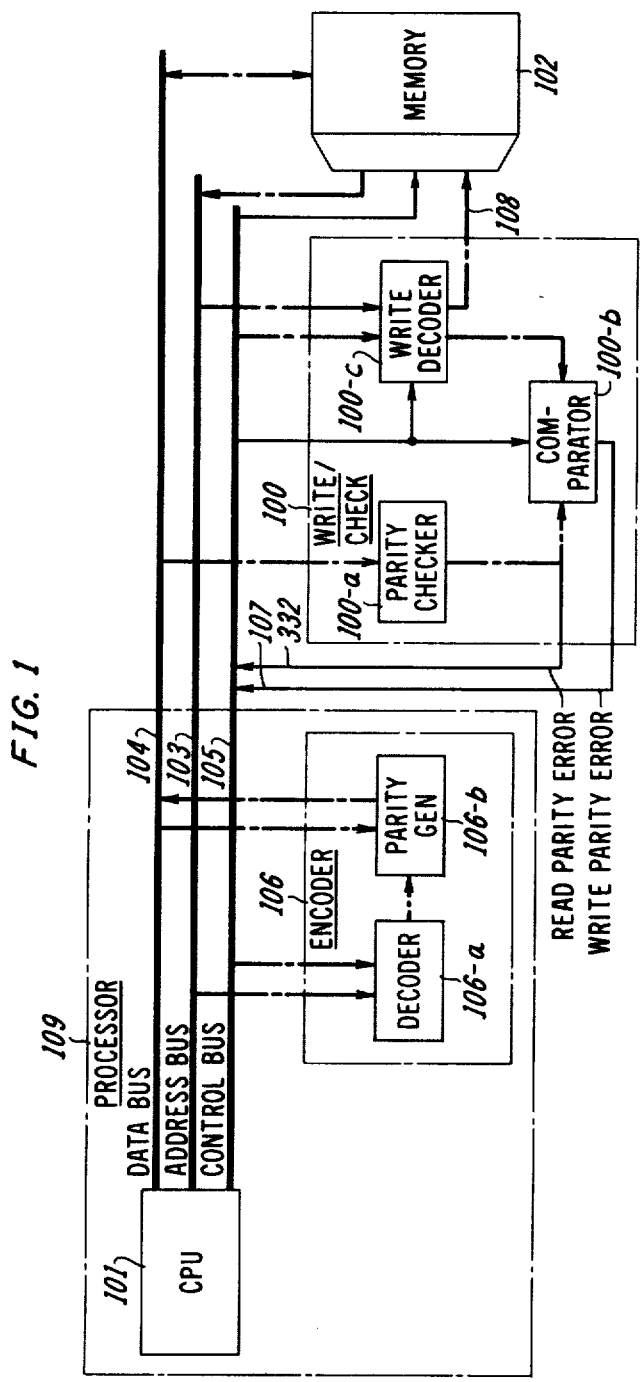
FIG. 1 is a block diagram of an illustrative data processing system which includes an encoder circuit and a write/check circuit in accordance with our invention together with a central processing unit (CPU) and a memory system.

One illustrative embodiment of a data processing system which includes error detection for writing individual bytes of a memory word location is shown in FIG. 1. The write/check circuit 100 and the encoder circuit 106 perform the error detection in accordance with the invention. The data processing system comprises processor 109, write/check circuit 100, and memory 102. Processor 109 comprises central processing unit (CPU) 101 and encoder circuit 106. Each word location of memory 102 which may be any well-known memory system is composed of four bytes with each byte having one parity bit and eight data bits. Any particular byte of a memory word location can be written without affecting the other bytes of that particular memory word location. CPU 101 may be any well-known processor adapted to read words and to selectively write bytes into a memory system. CPU 101 is connected to memory 102 via address bus 103, data bus 104, and control bus 105. CPU 101 writes one or more bytes of a particular memory word location in memory 102 by transmitting the address via address bus 103, control information via control bus 105, and data via data bus 104. Only the bytes designated to be written by the information transmitted via the address bus and the control bus are modified upon execution of a write memory instruction. The undesignated bytes of the memory word location remain unchanged. The bytes which are to be written are designated by the two least significant bits of the address transmitted via address bus 103 and two control signals transmitted via control bus 105.

Encoder circuit 106 which is connected to buses 103, 104, and 105 uses the information transmitted via these three buses to generate odd parity for each of the bytes to be written and to generate even parity for each of the bytes not to be written. Write/check circuit 100 decodes the two least significant address bits and the two control signals to determine which bytes are to be written and to generate and transmit write pulses to memory 102. One write pulse is supplied for each byte which is to be written. Write/check circuit 100 checks the parity of each byte transmitted via data bus 104 and compares this parity with whether or not a write pulse was generated for each byte. If a byte which has even parity is designated to be written, write/check circuit 100 transmits an error signal to CPU 101 via conductor 107. If a byte which was designated not to be written is written due to a malfunction of memory 102, a parity error will result for that particular byte when CPU 101 reads that particular memory word location at a later time. The combination of encoder circuit 106 and write/check circuit 100 not only detects errors occurring in data bus 104, address bus 103, control bus 105, and write decoder 100-c, but also detects errors resulting from memory malfunctions which cause the wrong byte of a given memory word location to be written.

Figure 2:
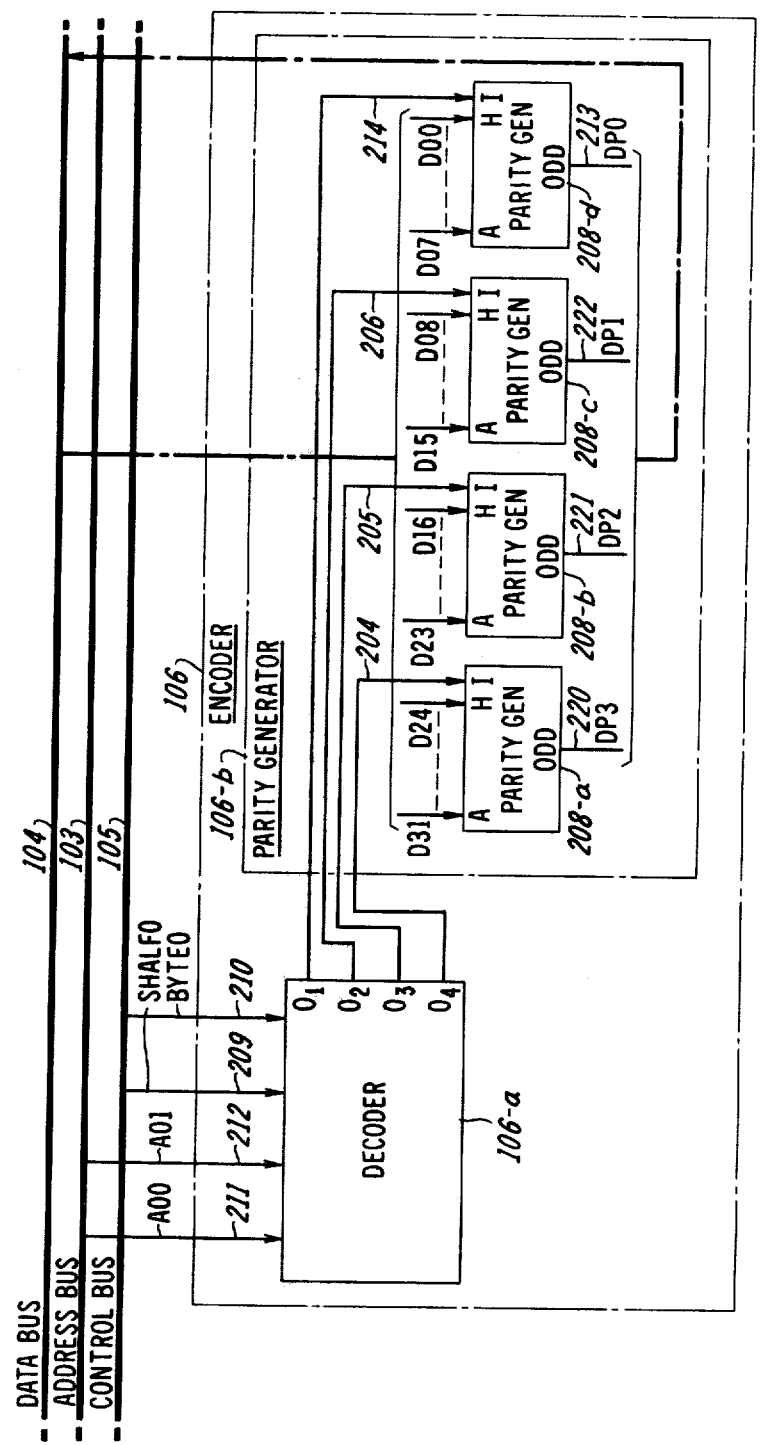
FIG. 2 is a block diagram showing additional details of the encoder circuit used in FIG. 1.

Encoder circuit 106 is shown in greater detail in FIG. 2. The purpose of encoder circuit 106 is to generate a parity bit for each byte transmitted from CPU 101 to memory 102 via data bus 104. If a byte is to be written into memory 102, encoder circuit 106 generates a parity bit such that odd parity results for that byte. If a byte is not to be written into memory 102, encoder circuit 106 generates a parity bit such that even parity results for that byte. The two least significant bits of the address transmitted via address bus 103 are A00 and A01 which are transmitted via conductors 211 and 212, respectively. Conductors 211 and 212 connect encoder 106 to address bus 103. The two control signals used from control bus 105 are the SHALFO and BYTEO signals which are transmitted via conductors 209 and 210, respectively. Conductors 209 and 210 connect encoder 106 to control bus 105. If the SHALFO signal is a "0", two bytes are to be written into memory. The two bytes can only be composed of data bits D0 through D15 or data bits D16 through D31. If two bytes are to be written, the A01 signal on conductor 212 designates whether the two most significant bytes or the two least significant bytes are to be written. If only one byte is to be written, the SHALFO signal is a "1" and the BYTEO is a "0". In that case, the byte to be written is determined by the A00 and A01 signals. If four bytes (a whole word) are to be written, both the SHALFO and the BYTEO signal are a "1".

By decoding the signals occurring on conductors 209 through 212, decoder 106-a generates output signals on output terminals 01 through 04 which are transmitted via conductors 214, 206, 205, and 204, respectively, to parity generator circuits 208-a through 208-d. Such a decoding circuit may be constructed from standard logic gates in a well-known manner. The output signals 01 through 04 of decoder 106-a are specifically defined in terms of the input signals in Table 1, shown below. As can be seen for example, if only the byte associated with data bits D0 through D7 is to be written (BYTE0 is a "0" and A00, A01, and SHALF0 are "1s"), a "1" is transmitted from output terminal 01 via conductor 214 to the I input terminal of parity generator 208-d circuit, and "0s" are transmitted from output terminals 02 through 04. Parity generator circuit 208-d correctly generates and transmits a "1" or a "0" via conductor 213 (DP0 signal), such that there is an odd number of bits in the combination of DP0 and D0 through D7. Parity generators 208-a through 208-c correctly generate and transmit "1s" or "0s" via conductors 220 through 222, respectively, such that there is an even number of bits in each byte associated with these parity generators.

TABLE 1

| SHALF0 | BYTE0 | A01 | A00 | 01 | 02 | 03 | 04 |
|---|---|---|---|---|---|---|---|
| 0 | X | 0 | X | 0 | 0 | 1 | 1 |
| 0 | X | 1 | X | 1 | 1 | 0 | 0 |
| 1 | 0 | 0 | 0 | 0 | 0 | 0 | 1 |
| 1 | 0 | 0 | 1 | 0 | 0 | 1 | 0 |
| 1 | 0 | 1 | 0 | 0 | 1 | 0 | 0 |
| 1 | 0 | 1 | 1 | 1 | 0 | 0 | 0 |
| 1 | 1 | X | X | 1 | 1 | 1 | 1 |

X = don't care

Figure 3:
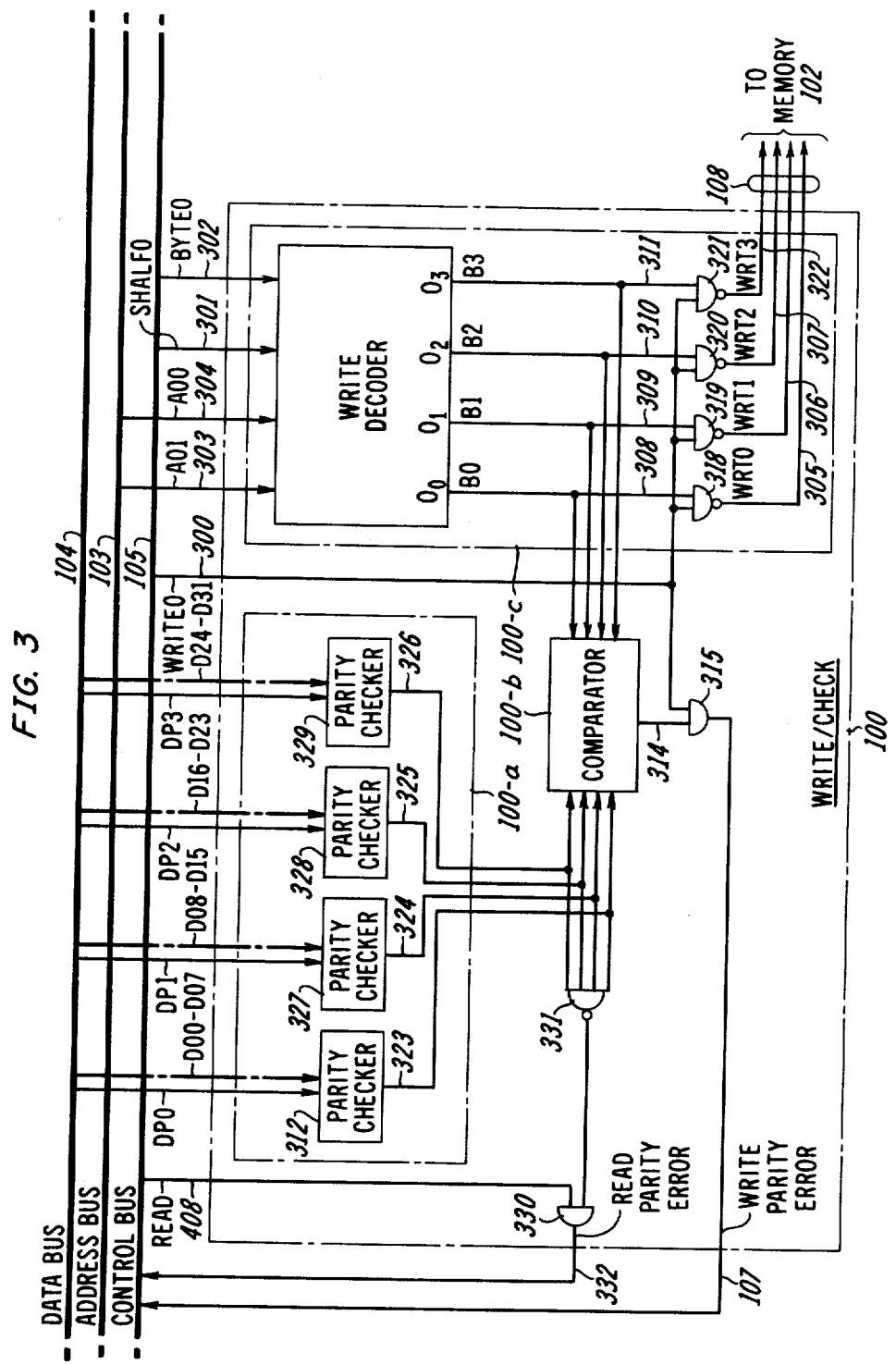
FIG. 3 is a block diagram of the write/check circuit used in FIG. 1.

Write/check circuit 100 generates and transmits the WRT0, WRT1, WRT2, and WRT3 signals via cable 108 to memory 102. Each of the signals, WRT0 through WRT3, is associated with a particular byte being transmitted via data bus 104 from processor 109 to memory 102 and is used to control the writing of that byte into memory 102. For example, if write/check circuit 100 transmits WRT0 to memory 102, memory 102 stores the byte composed of data bits D00 through D07 and parity bit DP0. The WRT0 through WRT3 are transmitted to memory 102 via conductors 305 through 307 and 322 which are designated as cable 108 on FIGS. 1, 3, and 4.

Write decoder 100-c is used to generate the B0 through B3 output signals which are transmitted from output terminals O0 through O3. The B0 through B3 signals are transmitted to NAND gates 318 through 321 via conductors 308 through 311, respectively. Write decoder 100-c generates the B0 through B3 signals by decoding the A01 and A00 signals from address bus 103 and the SHALF0 and BYTE0 signals from control bus 105. Such decoding circuitry may be constructed from standard logic gates in a well-known manner. The B0 through B3 output signals of write decoder 100-c are specifically defined in terms of the input signals in Table 2. As can be seen, for example, when the SHALF0 signal is a "1" and BYTE0 and A01 and A00 are a "0", output signal B3 is a "1" and the remaining B signals are "0s". NAND gates 318 through 321 perform a NAND operation of the appropriate B signal and the WRITE0 signal which is transmitted from processor 109 during a write memory operation. For example, if B3 is a "1" and the remaining B signals are "0s", the WRT3 signal is transmitted as a "0" via conductor 322 by NAND gate 321 when the WRITE0 signal is transmitted as a "1" via control bus 105, and the remaining NAND gates transmit "1s".

Write/check circuit 100 performs error detection by comparing the output of each individual parity checker circuit 312, 327, 328, or 329, with the corresponding B0 through B3 signal. If a mismatch is detected during a write memory operation, the write parity error is transmitted to CPU 101 via conductor 107.

TABLE 2

| SHALF0 | BYTE0 | A01 | A00 | B0 | B1 | B2 | B3 |
|--------|-------|-----|-----|----|----|----|----|
| 0 | X | 0 | X | 0 | 0 | 1 | 1 |
| 0 | X | 1 | X | 1 | 1 | 0 | 0 |
| 1 | 0 | 0 | 0 | 0 | 0 | 0 | 1 |
| 1 | 0 | 0 | 1 | 0 | 0 | 1 | 0 |
| 1 | 0 | 1 | 0 | 0 | 1 | 0 | 0 |
| 1 | 0 | 1 | 1 | 1 | 0 | 0 | 0 |
| 1 | 1 | X | X | 1 | 1 | 1 | 1 |

X = don't care

A parity check circuit transmits a "1" on its output terminal if the nine bits received on its input terminals contain an odd number of "1s". The output terminals of the four parity checkers, which transmit signals via conductors 323, 324, 325, and 326, are compared by comparator 100-b against the associated B0, B1, B2, and B3 signals which are transmitted via conductors 308, 309, 310, and 311, respectively. For example, parity checker circuit 312's output which is transmitted via conductor 323 is compared against signal B0 which is transmitted via conductor 308 by comparator 100-b. If a comparator 100-b detects a mismatch, comparator 100-b transmits a "1" from its output terminal to gate 315 via conductor 314. If a mismatch has occurred, gate 315 transmits a "1" via conductor 107 (the write parity error signal) to CPU 101 coincident with the WRITE0 signal. The write parity error signal informs CPU 101 that an error has occurred in the writing of memory 102.

Figure 4:
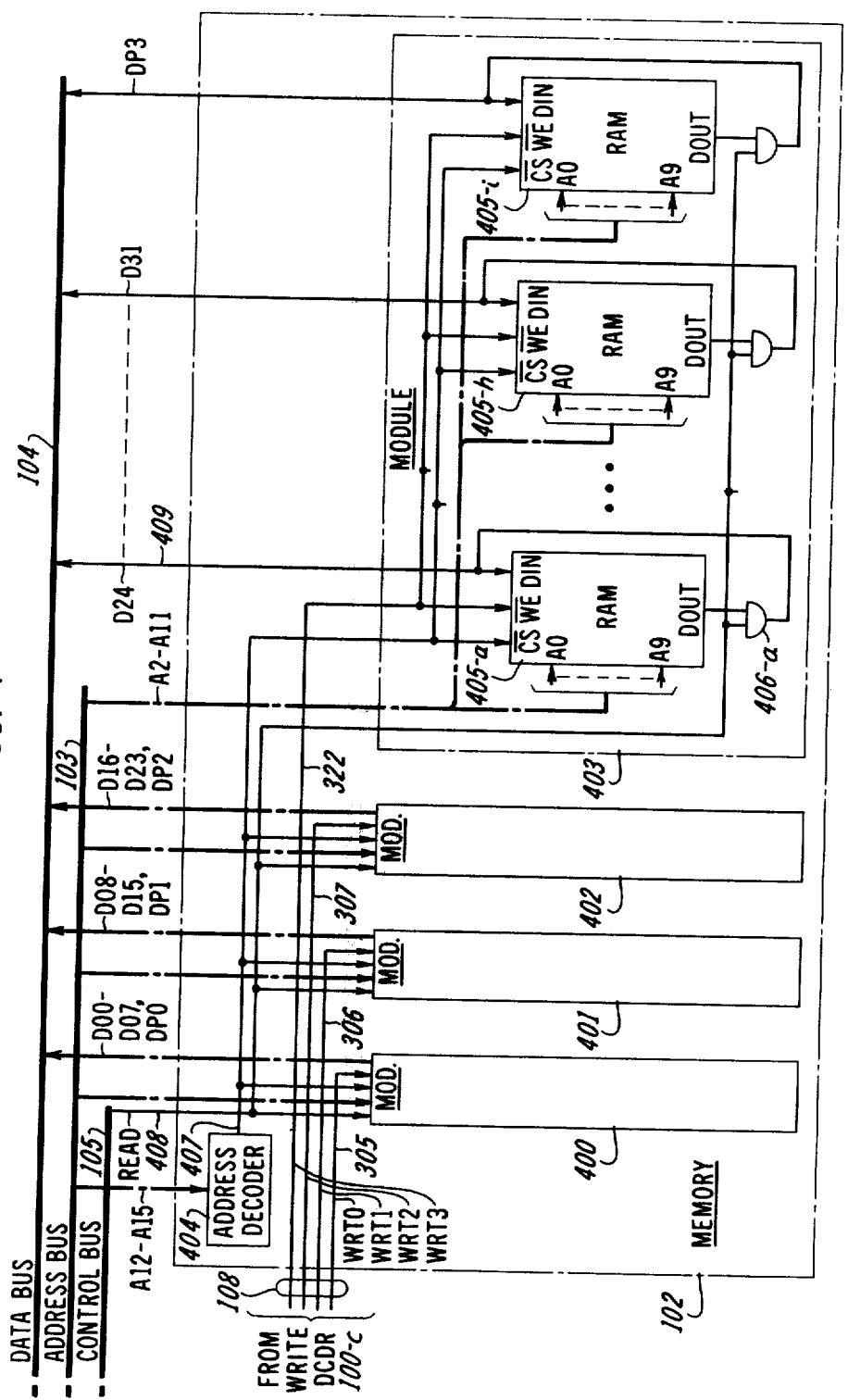
FIG. 4 is a block diagram of the memory system used in FIG. 1.

Memory 102 is shown in greater detail in FIG. 4 as comprising several memory modules. Memories such as memory 102 are well known in the art. Each memory module is capable of storing eight data bits and one parity bit, and comprises nine random access memory (RAM) integrated circuits. Memory module 403 is shown in greater detail and the other modules are identical in design. RAMs 405-a through 405-i include the necessary circuit to decode address bits A2 through A11 which are received by input terminals A0 through A9 via bus 103, and the remaining address bits (A12 through A15) transmitted via address bus 103 are decoded by address decoder 404. If memory 102 is being addressed by CPU 101, address decoder 404 transmits a "0" via conductor 407 which enables memory modules 400, 401, 402, and 403 to be read or written at the memory word location addressed by address bits A2 through A11.

As previously described, the writing of data into memory 102 is controlled by the WRT0 through WRT3 signals. The write operation is described only for RAM 405-a of memory module 403 but the other RAMs function in a similar manner. When the state of conductor 407 is a "0" (CPU 101 is addressing memory 102) and the state of conductor 322 (WRT3 signal) is a "0", RAM 405-a stores the state of conductor 409 (D24 bit) into the bit location addressed by address bits A2 through A11 on input terminals A0 through A9. Conductor 322 is connected to the data input (DIN) terminal of RAM 405-a. As shown in FIG. 4, the WRT3 signal is also transmitted via conductor 322 to RAMs 405-b through 405-i which results in these RAMs also storing the state of their DIN terminals simultaneously with RAM 405-a performance of this operation. In a similar manner, WRT0, WRT1, and WRT2 cause data to be written into modules 400, 401, and 402, respectively.

The reading of data from memory 102 by processor 109 is controlled by the address transmitted via address bus 103 and the read signal transmitted via control bus 105. Since processor 109 cannot selectively read bytes, memory 102 responds to the read signal and the address by transmitting a data word via data bus 104 to processor 109. This data word is checked by parity checker 100-a to assure that each byte contains an odd number of bits (odd parity). If one or more bytes have even parity, the write/check circuit 100 transmits a read parity error via control bus 105 to processor 109. By checking the data word read from memory 102 for even parity, the write/check circuit 100 assures that any malfunction of memory 102 which allowed a byte to be incorrectly written is detected.

The operation of reading a word from memory 102 can best be understood with reference to FIG. 4. As previously described, the reading of data from memory 102 is controlled by the read signal transmitted via control bus 105 and the address transmitted via address bus 103. The read operation is described only for RAM 405-a of memory module 403, but the other RAMs in the memory modules function in a similar manner. When the state of conductor 407 is a "0" (processor 109 is addressing memory 102) and the state of conductor 408 (read signal) is a "1", RAM 405-a transfers the bit stored in the addressed bit location to the data out (DOUT) terminal. When the read signal is a "1", AND gate 406-a transmits the state of the DOUT terminal via conductor 409 to data bus 104.

Error detection is done by checking the bytes which are being transmitted via data bus 104 from memory 102 for odd parity, with parity checker 100-a. For odd parity, the parity checker circuits 312, 327, 328, and 329 of FIG. 3 each transmit a "1" on conductors 323, 324, 325, and 326, respectively. If any parity checker circuit detects even parity, it transmits a "0" on the appropriate conductor. If a "0" is being transmitted via conductors 323, 324, 325, or 326, NAND gate 331 transmits a "1" to AND gate 330. If AND gate 330 is receiving a "1" from NAND gate 331 while a read operation is taking place (read signal is a "1"), AND gate 330 transmits the read parity error signal via conductor 332 and control bus 105 to processor 109.

It is to be understood that the above described embodiment is merely illustrative of the principles of the invention and that other arrangements may be devised by those skilled in the art without departing from the spirit and scope of the invention.

What is claimed is:

1. A data processing system comprising:
   a processor (109) for generating data words comprising a plurality of bytes each having a plurality of data bits and check bits, for generating address signals defining memory data word locations, and for generating byte write signals identifying specific bytes of said data words;
   control decoder means (100-c) responsive to said byte write signals to selectively generate a write control signal for each byte identified by said byte write signals;
   a memory arrangement (102) comprising a plurality of memory data word locations, each having a plurality of byte portions and responsive to said address signals and write control signals for storing said bytes into one of said memory data word locations;

transmission means interconnecting said processor, said control decoder and said memory arrangement for transmitting said data words, said address signals, and said byte write signals; and checker means (100-a) connected to said transmission means for generating a first output signal for each of said bytes whose bits have a predetermined arithmetic or logical relationship and for generating a second output signal for each of said bytes whose bits have some relationship other than said predetermined arithmetic or logical relationship; characterized in that said processor further comprises a check bit generator (106) responsive to said byte write signals for generating said check bits such that for each byte identified by said byte write signals the bits have said predetermined arithmetic or logical relationship, and for all other bytes the bits have some relationship other than said predetermined relationship; and said data processing system further comprises comparator means (100-b) connected to said checker means and to said control decoder means responsive to said write control signals and said output signals for generating a write memory error signal if for one of said bytes both said write control signal and said second output signal are generated.

2. A data processing system in accordance with claim 1 further characterized in that said check bit generator and said checker means are parity generators and parity checkers, respectively, and said predetermined arithmetic or logical relationship is even parity or odd parity.

3. A data processing system in accordance with claim 1 further characterized in that said processor is further adapted for generating read address signals and a read control signal;

said transmission means is further adapted for transmitting said read address signals and said read control signals;

said memory arrangement is responsive to said read control signal to access memory data word locations designated by said read address signals and to transmit data words stored therein via said transmission means;

said control decoder further comprises read error means (331, 330) for generating and transmitting a read error signal if said checker means generates said second output signal for any byte transmitted by said memory arrangement.

4. A data processing system in accordance with claim 1 further characterized in that said check bit generator (106) further comprises:

a decoder circuit (106-a) having a plurality of output terminals, each corresponding to a specified byte, and responsive to said byte write signals to generate a first decoder output signal on output terminals corresponding to bytes identified by said byte write signals and to generate a second decoder output signal on output terminals corresponding to bytes not identified by said byte write signals; and a plurality of generator circuits, each associated with a particular byte and responsive to data bits of said associated byte to generate check bits such that said data bits and said check bits have predetermined arithmetic or logical relationship if said first decoder output signal is generated on the output terminal corresponding to said associated byte and such that said data bits and check bits of said associated byte have some relationship other than said predetermined arithmetic or logical relationship if said second decoder output signal is generated on said output terminal corresponding to said associated byte.

* * * * *